United States Patent [19]

Jimbo et al.

[11] Patent Number: 4,528,487
[45] Date of Patent: Jul. 9, 1985

[54] ELECTRIC CAR CONTROL SYSTEM

[75] Inventors: Yoshiji Jimbo, Kudamatsu; Kazuyoshi Kotake, Katsuta, both of Japan

[73] Assignee: Hitachi, Ltd., Tokyo, Japan

[21] Appl. No.: 536,876

[22] Filed: Sep. 29, 1983

[30] Foreign Application Priority Data

Oct. 1, 1982 [JP] Japan .................. 57-170839

[51] Int. Cl.³ .............................................. H02P 5/06
[52] U.S. Cl. ...................... 318/338; 318/341; 318/345 R
[58] Field of Search ................ 318/79, 92, 338, 341, 318/345 R, 345 C, 345 B, 345 F, 345 H, 405, 493, 536

[56] References Cited

U.S. PATENT DOCUMENTS

| | | | |
|---|---|---|---|
| 3,378,746 | 4/1968 | Weiser | 318/338 X |
| 3,458,790 | 7/1969 | Wilkerson | 318/338 X |
| 4,099,111 | 7/1978 | Inaba et al. | 318/338 |
| 4,233,549 | 11/1980 | Dighe | 318/345 F X |
| 4,247,807 | 1/1981 | Wilson | 318/493 X |
| 4,322,667 | 3/1982 | Ohba | 318/338 |

Primary Examiner—Ulysses Weldon
Attorney, Agent, or Firm—Antonelli, Terry & Wands

[57] ABSTRACT

The DC power supply current-collected on the electric car is connected with a series circuit of the armature of a driving DC motor and an armature current control chopper and with a series circuit of a field winding and a field current control chopper.

Both choppers are controlled so that the armature current and field current are maintained constant until the flow rate of the armature chopper reaches the maximum after starting of electric car. In this period of time, the chopping frequency of the armature chopper is higher than that of the field chopper.

When the flow rate of the armature chopper reaches the maximum, the chopping frequency of the armature chopper is made coincident with that of the field chopper. At the same time, the field chopper is switched to the control operation by which the field current is decreased in order that the decrease of the armature current is restricted.

When the speed of the electric car is further increased so that the field current tends to decrease below the weak field limit value, a control system is operated to suppress the tendency and thereafter the field current becomes constant.

The chopping frequencies of both choppers are determined on the basis of a common clock pulse.

16 Claims, 12 Drawing Figures

FIG. 3(A) CHa 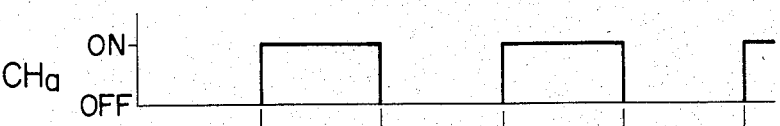
FIG. 3(B) CHf 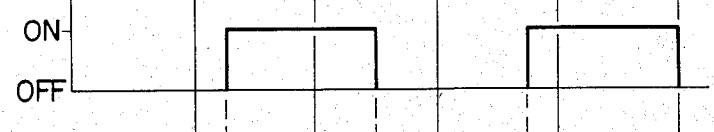
FIG. 3(C) $E_{CF}$ 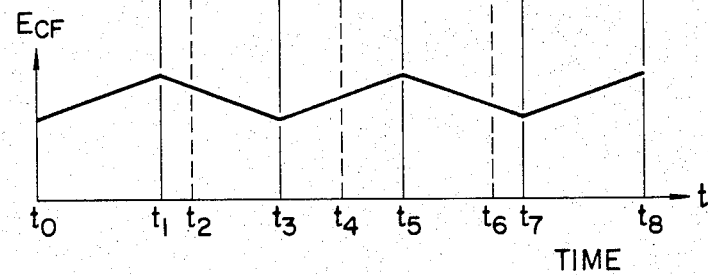
FIG. 4(A) CP 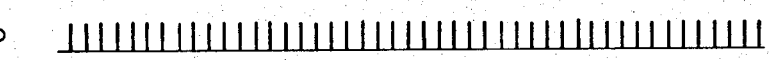
FIG. 4(B) $SP_a$ 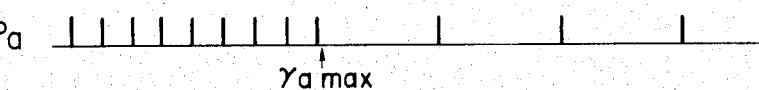
FIG. 4(C) $CH_a$ 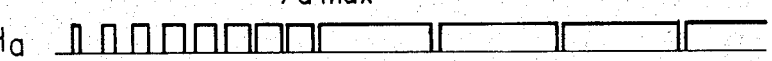
FIG. 4(D) $SP_f$ 
FIG. 4(E) $CH_f$ 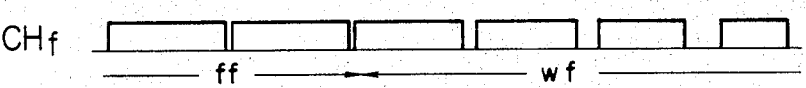
FIG. 4(F) $SP_f$ 
FIG. 4(G) $CH_f$ 

ELECTRIC CAR CONTROL SYSTEM

This invention relates to the improvement of a control apparatus suitable for an electric car having a DC motor, as a main motor, of which the armature and field system are separately controlled by the control apparatus.

The improvement of the available adhesion coefficient and reduction of the number of carriages of motor cars in a train have been desired for low carriage cost and low maintenance cost. One of the systems for the realization thereof is the variable-voltage variable-frequency control of an AC power applied to induction motors, and the other one is the system using a DC motor and separately controlling the currents flowing through the armature and field system to thereby make the speed of the motor constant. Both systems are entering into the stage of practical use with the recent rapid progress of semiconductor application technique.

It is an object of this invention to provide an electric car control system having a DC motor as a main motor for an electric car and choppers for separately controlling armature and field currents, respectively, wherein the pulsation of armature current and the thermal capacity of the armature chopper are reduced.

One feature of this invention is to have a mode in which the armature chopper is controlled at a chopping frequency higher than the chopping frequency of the field chopper.

Another feature of this invention is to control the armature chopper at a higher chopping frequency in a predetermined flow rate region than in the other region.

Still another feature of this invention is to have means for controlling the armature chopper to make the armature current constant, field chopper control means switching between a first mode in which the field current is made a relatively large constant value and a second mode in which the field current is adjusted so that the armature current is made constant, and means for changing the chopping frequency of the armature chopper in response to the switching between the modes.

The general idea of this invention will hereinafter be described briefly.

The chopper for chiefly controlling the armature current is referred to as the armature chopper and the chopper for chiefly controlling the field current is referred to as the field chopper below. When the DC motor to be used is a shunt or separately excited motor, the armature and field currents are completely independent of each other, but when it is a compound motor, the armature current to be controlled by the armature chopper includes part of field current (series field current) and the current to be controlled by the field chopper is part of the field current. The shunt motor will hereinafter be described as an example.

In order to reduce the current capacity of the field chopper and the pulsation of the field current caused by chopping, it is desired that the number of turns of the field winding be increased for small field current and that the inductance of the field circuit be increased. Consequently, while the armature current rating is, for example, 440A, the field current rating can be selected to be about 90A.

Thus, since the armature chopper has a relatively large current capacity and the armature circuit has a relatively small inductance, the pulsation of the armature current due to chopping becomes relatively large. Therefore, a reactor called the main smoothing reactor is inserted in the armature circuit, and its capacity is made as small as possible, preferably zero. Thus, it is desired to consider the reduction of the pulsation of the armature current in terms of control.

Thus, the chopping frequency of the armature chopper is made higher than that of the field chopper, so that the pulsation of the armature current can be reduced and that the capacity of the main smoothing reactor can be decreased.

However, the pulsation of the armature current becomes relatively large when the flow rate $\gamma a$ is about 0.5. If the chopping frequency is thoughtlessly increased, the chopper will increase the switching power loss. Therefore, it is advantageous to increase the chopping frequency of the armature chopper at a control region in which the pulsation of armature current is increased.

On the other hand, it is advantageous, from the viewpoint of constructing a simple control apparatus, to increase the chopping frequency until the flow rate of the armature chopper reaches substantially the maximum value.

The chopping frequency of the field chopper is desired to be fixed at an optimum value for even balance between the suppression of field current pulsation and that of switching loss of chopper. Although the chopping frequency of the armature chopper can always be selected to be higher than that of the field chopper, the switching loss should be reduced as long as the pulsation of the armature current lies in the allowable range. Accordingly, it is advantageous to provide a mode in which the chopping frequency of the armature chopper coincides with that of the field chopper. In particular, it is possible to suppress another pulsative component caused by the difference between the pulsation of the armature current and that of the field current.

In order to suppress the instability of control due to the difference between the chopping frequencies of both choppers and the beat phenomenon due to the fluctuation of the chopping frequency difference, it is desired to synchronize the chopping periods of both choppers. To this end, it is advantageous to determine the chopping periods of both choppers on the basis of common oscillation means, even althougth the chopping frequencies are the same or different. The output of the oscillation means should be divided in frequency and then applied to field chopper control means. To an armature chopper control means should also be applied this output through dividing-ratio switchable frequency dividing means.

In this case, it is easy to synchronize the chopping periods of both choppers with a phase difference therebetween and it is possible to further reduce the current pulsation included in the sum of the armature current and field current. Moreover, it is easy to change the chopping frequency of the armature chopper in a plurality of steps.

The present invention will be apparent from the following detailed description taken in conjunction with the accompanying drawings, in which.

FIGS. 3(A)-3(C) are explanatory diagrams for explaining the operation of the case in which the chopper frequencies are different; and FIGS. 4(A)-4(G) are explanatory diagrams for explaining the operation of an embodiment of this invention.

One embodiment of this invention will be described with reference to the drawings.

Figure 1:
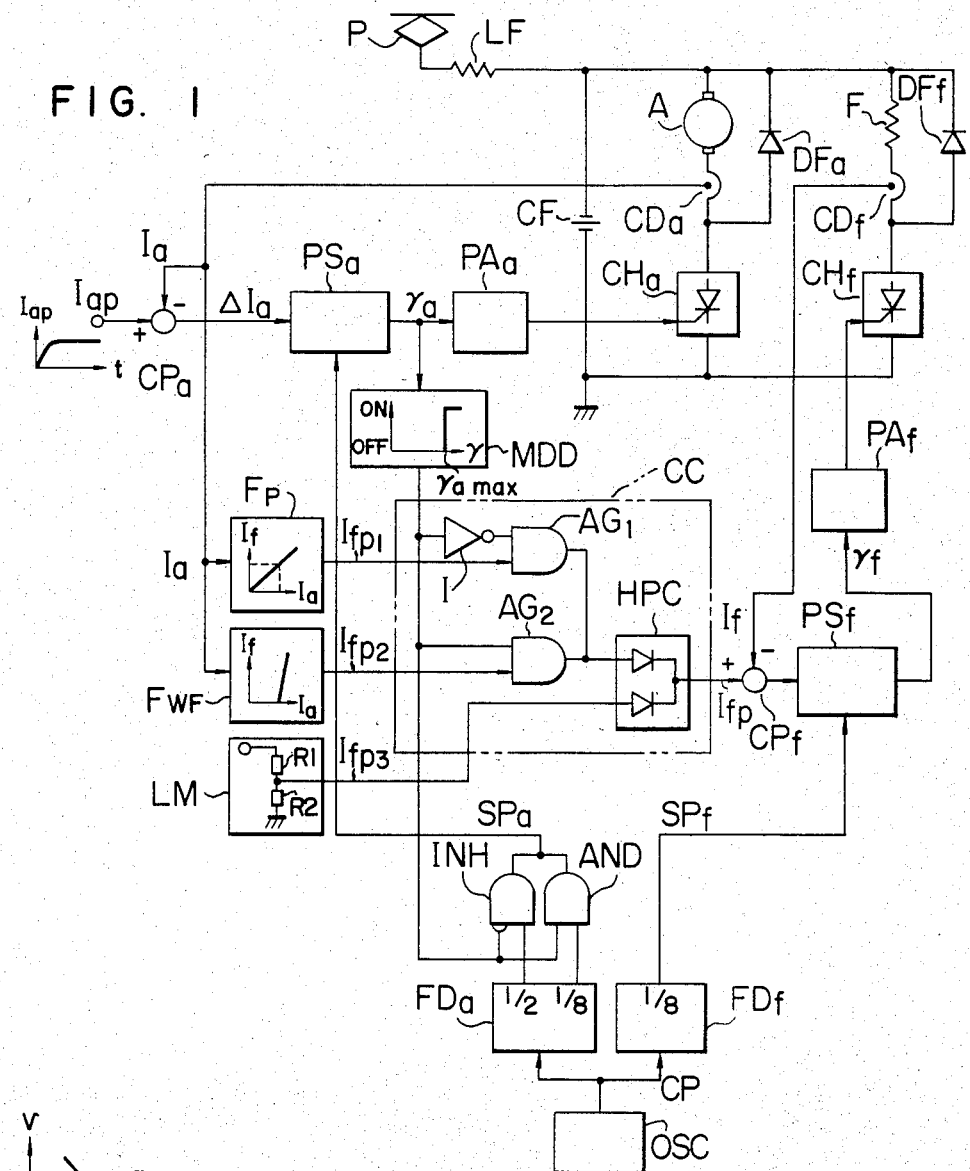
FIG. 1 shows a main circuit and control circuit of one embodiment of the electric car control system according to this invention.

FIG. 1 shows one embodiment of an electric car control system according to this invention. This embodiment includes a power main circuit and a control system therefor. In this main circuit, a series circuit of a filter reactor LF and a filter capacitor CF is connected between a pantograph P and a grounded wheel. Across the filter capacitor CF is connected a series circuit of an armature A of a DC motor and an armature chopper $CH_a$. A free wheel diode $DF_a$ is connected across the armature A. Also, across the capacitor CF is connected a series circuit of a shunt field system F and a field chopper $CH_f$. A free wheel diode $DF_f$ is connected in parallel with the field system F. In addition, current detectors CDa and $CD_f$ are provided to detect an armature current Ia and a field current $I_f$, respectively.

Figure 2:
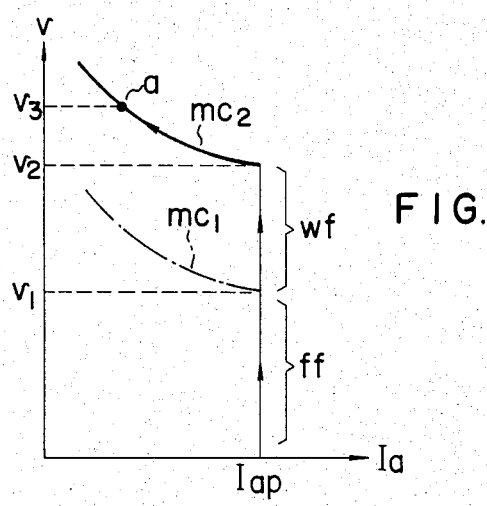
FIG. 2 is an explanatory diagram for explaining an example of the control mode.

The control system fundamentally performs such control as will be described below. As shown in FIG. 2, under full field system $f_f$ (for example, 150% of rating), the armature current is controlled to be constant by an armature current command $I_{ap}$, and to accelerate the electric car. The flow rate $\gamma a$ of the armature chopper $CH_a$ is increased with the increase of acceleration and reaches the maximum at speed v1. The electric car, if left as it is, becomes in a free acceleration condition according to the motor characteristic shown by one-dot chain line mc1. In order to further accelerate the electric car, a weak field control region wf is provided. In other words, the field current is decreased by the field chopper $CH_f$ so that the armature current $I_a$ is maintained to have a constant value, $I_{ap}$ until a predetermined weakest field rate (for example, 40% of rating) can be achieved. Thereafter, the electric car becomes in the free acceleration condition according to a motor characteristic mc2 and is made stable at speed v3 at point where it has a torque balanced with the resistance to the running of the electric car.

In FIG. 1, the armature current command $I_{ap}$ is compared with the armature current signal $I_a$ detected by the current detector $CD_a$, in a comparator $CP_a$, which thus produces a current deviation signal $\Delta I_a$. This deviation signal $\Delta I_a$ is passed through a phase shifter $PS_a$, thereby converted to a phase angle signal with the flow rate $\gamma a$. This phase angle signal is applied to and amplified by a pulse amplifier $PA_a$ to produce an on-off pulse therefrom. This pulse controls the armature chopper $CH_a$ to change its flow rate $\gamma a$ so that the armature current $I_a$ follows the armature current command $I_{ap}$.

The field current $I_f$ should be controlled to provide a constant field rate until the armature chopper CHa reaches the maximum flow rate $\gamma a$ max, and therefore a function generator Fp is provided. This function generator Fp, when applied with the armature current signal $I_a$, produces an output $I_{fp}1$ which is constant if the input is constant. At starting, the armature current command $I_{ap}$ is smoothly increased, and thus the field current and armature current are increased in proportion thereto as in the series motor characteristics. After the armature chopper $CH_a$ reaches the maximum flow rate $\gamma a$ max, the field current $I_f$ is decreased so that the armature current $I_a$ can be kept constant. For this purpose, a function generator $F_{WF}$ is provided. This function generator is also supplied with the armature current signal $I_a$, to produce a field current command $I_{fp}2$ which controls the armature current to be constant by causing the field current $I_f$ to be rapidly decreased if this input signal Ia tends to decrease. In addition, the DC motor has a weak field limit below which the field current cannot be reduced. A weak field limit generator LM is provided to produce a field current lower limit signal $I_{fp}3$.

These signals $I_{fp}1$ to $I_{fp}3$ are applied to a choosing circuit CC, which produces a field current command $I_{fp}$. When the flow rate $\gamma a$ of the chopper $CH_a$ reaches the maximum flow rate $\gamma a$ max, a maximum flow rate detector MDD generates output signal of "1". Before the maximum flow rate is reached, the output of the detector is "0". Therefore, if $\gamma a < \gamma a$ max, the inverter I produces "1" thereby opening an analog gate AG1. Thus, the signals $I_{fp}1$ and $I_{fp}3$ are applied to a higher priority circuit HPC, which then produces the field current command $I_{fp} = I_{fp}1$ provided that the weakest field current signal $I_{fp}3 < I_{fp}1$. In other words, the field current command $I_{fp}$ becomes constant (for example, full field system of 150% of rating) until the flow rate $\gamma a$ of the armature chopper $CH_a$ reaches the maximum.

If $\gamma a \geq \gamma a$ max, the maximum flow rate detector MDD produces "1", and thus the analog gate AG1 is gated closed and the analog gate AG2 is gated open. Consequently, the field current command $I_{fp}$ equals $I_{fp}2$, provided that $I_{fp}2 > I_{fp}3$. That is, the field current command is gradually decreased to keep the armature current Ia constant.

The field current command $I_{fp}$ thus produced is compared with the output signal $I_f$ from the current detector $CD_f$ in a comparator $CP_f$, the output of which controls the field chopper $CH_f$ through a phase shifter $PS_f$ and then through a pulse amplifier $PA_f$.

In this way, the power characteristic of the electric car can be obtained as shown in FIG. 2.

The phase shifters $PS_a$ and $PS_f$ are supplied with synchronizing signals basic for the on-off period of the choppers, from a common oscillator OSC through frequency dividers FDa and $FD_f$, respectively.

Now, with reference to FIGS. 3(A)-3(C), a description will be made of a specific case in which the armature chopper $CH_a$ and field chopper $CH_f$ are controlled by different frequencies with no such relation.

If the frequencies of the armature chopper and field chopper are represented by fa and ff, respectively, a harmonic component of the difference frequency (fa−ff) therebetween occurs in addition to the frequencies fa and ff. Thus, the inductive interference by the harmonic component (fa−ff) must be considered to remove, resulting in difficulty of selecting the frequencies of the armature chopper and field chopper. If the frequency of the armature chopper is relatively close to that of the field chopper, a low-frequency vibration occurs to resonate the filters LF and CF, causing an oscillation of current in the main circuit.

The filter capacitor voltage, $E_{cf}$ is greatly affected by the armature chopper CHa for controlling large current. As shown in FIG. 3, the voltage is reduced during the intervals $t_1$ to $t_3$ and $t_5$ to $t_7$ in which the armature chopper $CH_a$ is on, and increased during the intervals $t_0$ to $t_1$, $t_3$ to $t_5$ and $t_7$ to $t_8$ in which it is off. When the chopper $CH_a$ becomes off at time $t_0$, the filter capacitor voltage $E_{cf}$ is increased. When the armature chopper $CH_a$ is turned on at time $t_1$, the filter capacitor voltage $E_{cf}$ is decreased. Similarly, when the chopper $CH_a$ is further turned on and off, the voltage is decreased and increased. If the frequency of the field chopper $CH_f$ is different from that of the armature chopper $CH_a$, and if both choppers are off at time $t_0$, the field chopper $CH_f$ becomes on at time $t_2$, off at time $t_4$ and on at time $t_6$. Thus, the filter capacitor voltage $E_{cf}$ takes different values when the field chopper $CH_f$ is on and off. In order to keep the field current $I_f$ constant even when the filter capacitor voltage $E_{cf}$ is changed, it is necessary to change the flow rate $\gamma f$ of the field chopper $CH_f$ with the change of the filter capacitor voltage $E_{cf}$.

However, since the flow rate responds to the voltage change with a time lag, the field current $I_f$ causes hunting with a period determined by the response time of the flow rate and that of field system. As a result, the armature voltage changes, thereby inducing the hunting of the armature current $I_a$ to bring about an unstable controlled state.

It is now assumed that the common oscillator OSC oscillates at 2000 Hz. The output pulse, CP is shown in FIG. 4(A). If the frequency divider $FD_a$ produces a pulse the frequency of which is half that of the input pulse to the divider, the synchronizing signal, $SP_a$ applied from the divider to the phase shifter $PS_a$ for the armature chopper $CH_a$ as the synchronizing signal $SP_a$ has the frequency of 1000 Hz as shown in FIG. 4(B) on the left hand side. If an inhibit gate INH is provided so that the frequency divider $FD_f$ produces a pulse of ⅛ the frequency of the input pulse to the divider, the synchronizing signal $SP_f$ applied from the divider to the phase shifter $PS_f$ for the field chopper $CH_f$ is a pulse train of 250 Hz as shown in FIG. 4(D).

At starting of an electric car, the field current command $I_{fp}$ equals $I_{fp}1$ (for example, constant 150% of rating), and as is obvious from FIG. 4(E), the field chopper $CH_f$ has a large value of flow rate $\gamma f$ which is controlled in the full field state ff.

At this time, the flow rate of armature chopper $CH_a$ is controlled so that the armature current $I_a$ equals $I_{ap}$ (constant). In the region in which the speed of the electric car is low and the voltage of the armature A is low, the flow rate $\gamma a$ is small and increases with the increase of speed. Thus, the on-off state of the armature chopper $CH_a$ changes with the increase of speed as shown in FIG. 4(C).

When the speed of the electric car reaches v1 in FIG. 2, the flow rate $\gamma a$ of the armature chopper $CH_a$ arrives at the maximum $\gamma a$ max. This maximum flow rate is detected by the maximum flow rate detector MDD, and as described above, the field current command $I_{fp}$ is changed to $I_{fp}2$, the frequency divider FDa producing a pulse of ⅛ the frequency of the input pulse to the divider. In other words, the output from the maximum flow rate detector MDD inhibits the inhibit gate INH and opens the AND gate AND. Thus, after the electric car reaches the speed v1 in FIG. 2, the synchronizing signal $SP_a$ to the phase shifter $PS_a$ has the frequency of 250 Hz as shown in FIG. 4(B) on the right hand side and the armature chopper CHa is controlled to turn on and off by the frequency of 250 Hz. At this time, since the armature current constant-control system is not changed and can increase the maximum flow rate by the amount corresponding to the increment of the on-off period, the flow rate is slightly increased as shown in FIG. 4(C).

On the other hand, the flow rate $\gamma f$ of the field chopper $CH_f$ is decreased to maintain the armature current Ia constant in accordance with the characteristic of the function generator $F_{WF}$. This control region is indicated by wf in FIG. 2, and the field chopper $CH_f$ is controlled to turn on and off as shown in FIG. 4(E) on the right side.

When the speed of the electric car is further increased to reach v2 in FIG. 2, the output signal $I_{fp}2$ from the function generator $F_{WF}$ tends to decrease below the output signal $I_{fp}3$ from the weak field limiter LM. However, by the action of the higher priority circuit HPC, the field current command $I_{fp}$ is limited to equal to or larger than $I_{fp}3$, and thereafter the field current $I_f$ is fixed at, for example, 40% of rating. The armature chopper $CH_a$ is already at the maximum flow rate and the electric car is in natural acceleration condition along the characteristic (mc2 in FIG. 2) of the motor under this condition. The armature current Ia decreases with the acceleration. Then, the speed of the car is stabilized at v3 when the power torque necessary for the car to run coincides with the motor torque, for example, point a in FIG. 2.

As a result of the control, the armature chopper CHa and field chopper $CH_f$ are synchronized with each other over the full field region ff and weak field region wf as is evident from FIGS. 4(C) to 4(E), and thus there is no fear that instability of control is brought about and that the beat frequency component is caused.

The choppers may be synchronized with a phase difference therebetween kept as long as the on-off periods of both choppers are synchronized with each other. FIGS. 4(F) and 4(G) show that the field chopper $CH_f$ is synchronized with the armature chopper $CH_a$ shown in FIGS. 4(B) and 4(C), with a phase difference therebetween being kept. It is apparent that this condition can be realized by slight change of connection in the frequency divider $FD_a$ or $FD_f$. Also in this case, the abovementioned effect can be realized and in addition, in the weak field region wf the sum, $(I_a + I_f)$ of the armature current $I_a$ and field current $I_f$, or the chopping ripple coefficient included in the line current can be reduced.

According to this embodiment, the flow rate $\gamma a$ of the armature chopper $CH_a$ is controlled from the minimum to the maximum, and in the region where the pulsation of the armature current Ia is relatively large (the maximum around $\gamma a = 0.5$), the chopping frequency can be increased and the capacity of the main smoothing reactor can be reduced or omitted. In the weak field region wf where the flow rate $\gamma a$ of the armature chopper $CH_a$ is near the maximum flow rate, the pulsation of the armature current $I_a$ is originally relatively small, and thus the switching loss can be reduced by relatively lowering the chopper frequency.

Moreover, by producing a pulse train for determining the chopping periods of both choppers from the common oscillator OSC, it is possible to always synchronize the chopping periods of both choppers, effect the stability of control and prevent the beat frequency from occuring.

According to this invention, by providing the mode in which the chopping frequency of the armature chopper is made higher than that of the field chopper, it is possible to suppress the pulsation of the armature current at the most suitable chopping frequency of the field chopper.

We claim:

1. An electric car control system comprising:
a DC motor for driving an electric car;

a first series circuit, including an armature winding of said DC motor and an armature chopper for adjusting a current flowing into said armature winding, connected in series to a DC power source;

a second series circuit, including a field winding of said DC motor and a field chopper for adjusting a current flowing into said field winding, connected in series to said DC power source;

armature chopper control means for driving said armature chopper at one of first and second chopping frequencies and for controlling a conduction ratio of said armature chopper so that a ratio of ON time to OFF time thereof in each period of said first and second chopping frequencies is varied;

field chopper control means for driving said field chopper at a constant set chopping frequency and for controlling a conduction ratio of said field chopper so that a ratio of ON time to OFF time thereof in each period of said set chopping frequency is varied; and command means for selectively delivering to said armature chopper control means one of a first command for driving said armature chopper at said first chopping frequency which is higher than said set chopping frequency of said field chopping control means and a second command for driving said armature chopper at said second chopping frequency which is lower than said first chopping frequency.

2. An electric car control system according to claim 1, wherein said command means delivers said first command when a speed of said electric car is in a first speed range and delivers said second command when a speed of said electric motor is in a second speed range.

3. An electric car control system according to claim 2, wherein the first speed range is a low speed range and the second speed range is a high speed range.

4. An electric car control system according to claim 1, wherein said command means delivers said first command in a power running state of the electric car and delivers said second command in response to the conduction ratio of said armature chopper increasing to a predetermined ratio.

5. An electric car control system according to claim 1, wherein said constant set chopping frequency of said field chopper control means is equal to said second chopping frequency.

6. An electric car control system according to claim 1, further comprising common oscillation means for supplying a pulse train, said armature and field chopper control means determining the chopping frequencies of said armature chopper and said field chopper in accordance with the pulse train of said common oscillation means.

7. An electric car control means according to claim 6, further comprising first frequency dividing means disposed between said common oscillation means and said armature chopper control means, second frequency dividing means disposed between said common oscillation means and said field chopper control means, and means for changing a dividing ratio of said first frequency dividing means.

8. An electric car control system according to claim 7, wherein said first and second frequency dividing means provide first and second pulse trains which are synchronized to each other with a given phase difference therebetween for said armature and field chopper, respectively.

9. An electric car control system comprising:
a DC motor for driving an electric car;
a first series circuit, including an armature winding of said DC motor and an armature chopper for adjusting a current flowing into said armature winding, connected in series to a DC power source;

a second series circuit, including a field winding of said DC motor and a field chopper for adjusting a current flowing into said field winding, connected in series to said DC power source;

armature chopper control means for driving said armature chopper at one of first and second chopping frequencies and for controlling a conduction ratio of said armature chopper so that a ratio of ON time to OFF time thereof in each period of said first and second chopping frequencies is varied;

field chopper control means for driving said field chopper at a constant set chopping frequency and for controlling a conduction ratio of said field chopper so that a ratio of ON time to OFF time thereof in each period of said set chopping frequency is varied;

armature current control means for delivering to said armature chopper control means a conduction ratio command so that the armature current traces an armature current command of a given command value of the armature current;

a first field current control means for delivering to said field chopper control means a conduction ratio command for changing the field current in proportion to the armature current;

a second field current control means for delivering to said field chopper control means a conduction ratio command for adjusting the field current so as to maintain the armature current at a constant value;

mode selection means for selecting one of a first mode for enabling said first field current control means and a second mode for enabling said second field current control means; and chopping frequency change-over command means for selectively delivering to said armature chopper control means one of a first command for driving said armature chopper at said first chopping frequency which is higher than said set chopping frequency of said field chopper control means and a second command for driving said armature chopper at said second chopping frequency which is lower than said first chopping frequency in accordance with one of said first and second modes selected by said mode selection means.

10. An electric car control system according to claim 9, wherein said given armature current command value is a constant value, and said first field current control means delivers to said field chopper control means a conduction ratio command so that the field current becomes a constant value.

11. An electric car control system according to claim 10, wherein said chopping frequency change-over command means delivers said first command when said first mode is selected by said mode selection means and delivers said second command when said second mode is selected by said mode selection means.

12. An electric car control system according to claim 9, wherein said chopping frequency change-over command means delivers said first command when said first mode is selected by said mode selection means and delivers said second command when said second mode is selected by said mode selection means.

13. An electric car control means according to claim 9, wherein said set chopping frequency of said field chopper control means is equal to said second chopping frequency.

14. An electric car control system according to claim 13, further comprising common oscillation means for supplying a pulse train, said field chopper control means and said armature chopper control means determining the chopping frequencies of said field chopper and said armature chopper in accordance with the pulse train of said common oscillation means.

15. An electric car control system according to claim 14, further comprising first frequency dividing means disposed between said common oscillation means and said armature chopper control means, second frequency dividing means disposed between said common oscillation means and said field chopper control means, and means for changing a dividing ratio of said first frequency dividing means.

16. An electric car control system according to claim 15, wherein said first and second frequency dividing means provide first and second pulse trains which are synchronized to each other with a given phase difference therebetween for said armature and field choppers, respectively.

* * * * *